G. F. CONNER.
PNEUMATIC STACKER.
APPLICATION FILED OCT. 8, 1909.
972,437.
Patented Oct. 11, 1910.
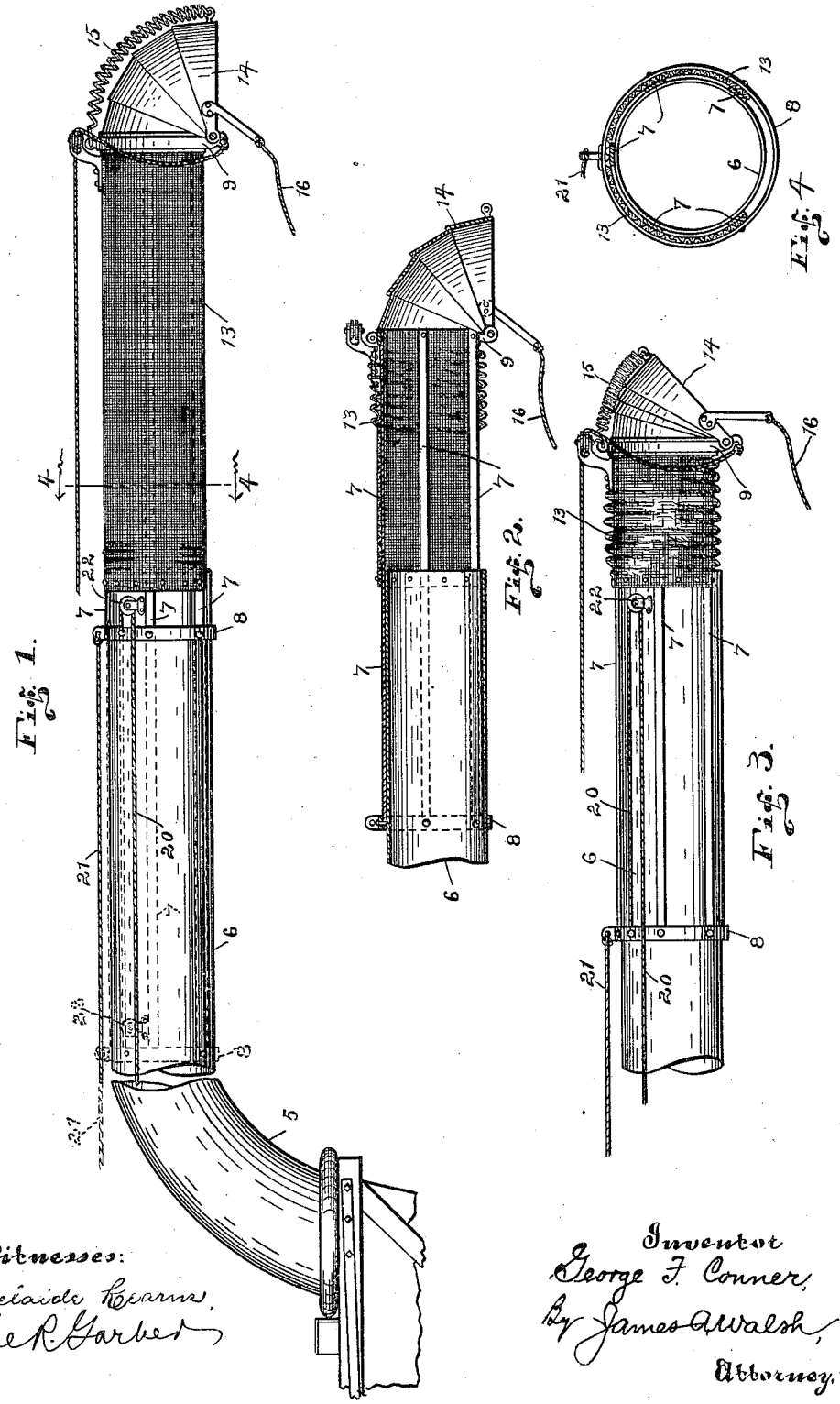
Witnesses:
Adelaide Kearns
Lee R. Garber
Inventor
George F. Conner,
By James A. Walsh,
Attorney.

UNITED STATES PATENT OFFICE.

GEORGE F. CONNER, OF PORT HURON, MICHIGAN, ASSIGNOR TO THE INDIANA MANUFACTURING COMPANY, OF INDIANAPOLIS, INDIANA, A CORPORATION OF WEST VIRGINIA.

PNEUMATIC STACKER.

972,437.

Specification of Letters Patent.  Patented Oct. 11, 1910.

Application filed October 8, 1909. Serial No. 521,646.

*To all whom it may concern:*

Be it known that I, GEORGE F. CONNER, a citizen of the United States, residing at Port Huron, in the county of St. Clair and State of Michigan, have invented certain new and useful Improvements in Pneumatic Stackers, of which the following is a specification.

My invention relates to improvements in pneumatic stackers, and particularly to the discharge chutes thereof, which I am enabled to increase or decrease in length in a simple and effective manner, and which may be readily manipulated to discharge material in different directions and at various distances from the threshing or other machine, and by which I dispense with the telescopic chute commonly employed, all as will hereinafter more fully appear.

In the accompanying drawings, which are made a part hereof, Figure 1 is a side elevation of a stacker chute embodying my said invention, and projected to its full extent; Fig. 2, a detail sectional view showing said chute partially retracted; Fig. 3, a similar view showing said chute still further retracted; and Fig. 4 is a transverse sectional view on the dotted line 4—4 in Fig. 1.

In said drawings the portions marked 5 indicate the revolving stump, which may be of any ordinary or desired construction, and to which the main discharge chute 6 is designed to be connected. At the outer end of said chute 6 I provide a frame consisting of flexible bars, 7, which are connected at their inner ends by a sliding band, 8, which surrounds said chute, and connects said bars at their outer ends to band, 9. I secure at the extreme outer end of said chute between the bars 7 and surrounding the frame comprising said bars a flexible tube-like covering, 13, by means of rivets or otherwise, and the outer end thereof is secured to band 9 in a similar or other desired manner. Also secured to said band 9 is an adjustable and collapsible hood, 14, (comprising a plurality of pivotally mounted sections) which may be revolubly mounted thereon in a well known manner, and which is normally held in retracted position by means of the spring 15, and is drawn outwardly and downwardly to deflecting position by means of a cord, 16.

Any ordinary arrangement for longitudinally extending and retracting my improved collapsible chute may be employed, that which I have chosen to illustrate being the ropes 20, 21, the end of the former of which is attached to band 8, and runs about a sheave, 22, attached to the chute 6, and thence in the direction of the operator, while rope 21 may also be attached to said band 8 and likewise extends to a point to be conveniently controlled by the operator.

In operation, when the chute is extended to full length as indicated in Fig. 1, and it is desired to retract the same, the rope 21 may be drawn toward the separator by a windlass or other suitable means, which causes band 8 and the attached bars 7 and band 9 to slide along forwardly on chute 6, which sliding movement of this frame results in the gradual collapsion of flexible tube 13, as indicated in Figs. 2 and 3, by which method, as will be readily understood, I am enabled to materially reduce the chute as a whole in length, and in a similar manner by manipulating rope 20 said frame with its flexible tube may be projected outwardly the desired distance and the chute thus longitudinally extended, so that the chute structure as a whole will assume the position indicated in Fig. 1 and be practically a non-telescopic continuous one-piece chute capable of longitudinal extension and retraction, and whereby I obtain the same results as have heretofore been accomplished by a plurality of telescopically mounted chute sections.

I am aware that spring-actuated collapsible hoods have heretofore been employed, but so far as has come to my notice such hoods have been automatically held in fully extended or deflecting position by means of springs, and collapsed by means of a cord. In discharging wet and heavy straw and the like, however, such material frequently discharges through the chute in wads which strike the hood structure with such force as to cause the hood sections to collapse because of the inability of the springs to retain them in fixed position under such conditions, and therefore the proper discharge of material is not always obtained. By my present arrangement the hood actuating devices are reversed, the spring 15 retaining the hood sections in collapsed position so that said sections lie normally in line with the upper side of the chute, permitting the material to be discharged in a substantially straight path, but when it is desired to draw the hood into deflecting position the cord 16 is accordingly manipulated, and when held taut by the ordinary windlass or other cord operating means the hood sections are fixedly held in extended position and their collapsion under the conditions above pointed out is thus prevented.

I claim as my invention:

1. A pneumatic stacker chute, comprising an inner rigid section and a collapsible extensible section mounted at the outer end thereof, means for collapsing said extensible section to shorten said chute, and means for extending said section to lengthen said chute.

2. A pneumatic stacker chute comprising an elbow and a rigid chute section projecting therefrom, a collapsible extensible section mounted at the end of said rigid section, and means connected to said extensible section for extending and retracting the same to increase or decrease said chute in length.

3. A pneumatic stacker chute, comprising a main section, a frame movably mounted on the discharge end thereof, a collapsible extensible chute section mounted on said frame, and means for longitudinally projecting and retracting said frame to extend or collapse said extensible section for increasing or decreasing said chute in length.

4. The combination, with a pneumatic stacker, of a frame at the outer end thereof comprising an inner and an outer band connected by bars, a flexible covering surrounding said frame, means for retracting said frame and collapsing said covering thereon to decrease the length of said chute, and means for outwardly projecting said frame and extending said covering to increase said chute in length whereby material may be discharged at varying distances from the separating machine to which said chute is attached.

5. A pneumatic stacker chute comprising a main section adapted to communicate with a grain separating machine, a collapsible extensible chute section connected to said main section, means connected to said extensible section for collapsing the same and decreasing the length of said chute, and means connected to said extensible section for extending the same to increase said chute as a whole in length.

6. The combination with a pneumatic stacker chute embodying a collapsible extensible chute section at its discharge end, an adjustable deflector at the outer end of said section, means for adjusting said deflector, and means connected with said section for projecting and retracting the same to increase or decrease the length of said chute as a whole.

GEORGE F. CONNER.

Witnesses:
L. H. REYNOLDS,
L. M. MILLER.